US009332210B2

(12) United States Patent
Demandolx et al.

(10) Patent No.: US 9,332,210 B2
(45) Date of Patent: May 3, 2016

(54) COMBINING MULTIPLE IMAGES IN BRACKETED PHOTOGRAPHY

(71) Applicant: Microsoft Technology Licensing, LLC, Redmond, WA (US)

(72) Inventors: Denis Demandolx, Bellevue, WA (US); Douglas Alan Ricard, Woodinville, WA (US); Thomas Lund Dideriksen, Seattle, WA (US); Kevin Geeyoung Chiu, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 14/732,665

(22) Filed: Jun. 5, 2015

(65) Prior Publication Data
US 2015/0350515 A1    Dec. 3, 2015

Related U.S. Application Data

(62) Division of application No. 13/523,921, filed on Jun. 15, 2012, now Pat. No. 9,083,935.

(51) Int. Cl.
*H04N 5/77* (2006.01)
*G06T 5/40* (2006.01)
(Continued)

(52) U.S. Cl.
CPC *H04N 5/77* (2013.01); *G06T 5/009* (2013.01); *G06T 5/40* (2013.01); *G06T 5/50* (2013.01); *H04N 5/2352* (2013.01); *H04N 5/2354* (2013.01); *H04N 5/2355* (2013.01); *H04N 5/2356* (2013.01); *H04N 5/772* (2013.01); *G06T 2200/21* (2013.01); *G06T 2200/28* (2013.01); *G06T 2207/10004* (2013.01); *G06T 2207/10024* (2013.01); *G06T 2207/10028* (2013.01);
(Continued)

(58) Field of Classification Search
CPC ....... H04N 5/77; H04N 5/772; H04N 5/2352; H04N 5/2355; H04N 5/2356; H04N 5/2354; G06T 5/40; G06T 5/50; G06T 5/009; G06T 2200/21; G06T 2200/28; G06T 2207/10028; G06T 2207/10004; G06T 2207/10024; G06T 2207/20208; G06T 2207/20221; G06T 2207/03
See application file for complete search history.

(56) References Cited

U.S. PATENT DOCUMENTS 7,142,723 B2   11/2006 Kang et al.
7,239,805 B2    7/2007 Uyttendaele et al.
(Continued)

OTHER PUBLICATIONS

Agrawal, et al., "Removing Photography Artifacts using Gradient Projection and Flash-Exposure Sampling", Retrieved at <<http://www.umiacs.umd.edu/~aagrawal/Amit_siggraph2005_flashnoflash_lowres.pdf>>, In Proceedings of ACM SIGGRAPH, vol. 24, No. 3., Jul. 2005, pp. 828-835.
(Continued)

*Primary Examiner* — Jason Flohre
(74) *Attorney, Agent, or Firm* — Judy Yee; Micky Minhas

(57) ABSTRACT

Embodiments provide a unified method for combining images such as high dynamic range images, flash-no-flash image pairs, and/or other images. Weight masks are defined for each of the plurality of images by calculating coefficients for each of the weight masks. Calculating the coefficients includes, at least, performing histogram alignment between a reference image and each of the other input images and by applying a mismatch bias to the coefficients as a function of the histogram alignment. After applying the weight masks to the corresponding images, the images are combined to produce a final image.

16 Claims, 7 Drawing Sheets

(51) Int. Cl.
*H04N 5/235* (2006.01)
*G06T 5/50* (2006.01)
*G06T 5/00* (2006.01)

(52) U.S. Cl.
CPC ............... *G06T2207/20208* (2013.01); *G06T 2207/20221* (2013.01)

(56) References Cited

U.S. PATENT DOCUMENTS

| | | |
|---|---|---|
| 7,454,136 B2 | 11/2008 | Raskar et al. |
| 7,457,477 B2 | 11/2008 | Petschnigg et al. |
| 7,949,182 B2 | 5/2011 | Pollard et al. |
| 2005/0013501 A1 | 1/2005 | Kang et al. |
| 2007/0242900 A1 | 10/2007 | Chen et al. |
| 2009/0096896 A1 | 4/2009 | Imafuji et al. |
| 2010/0103194 A1 | 4/2010 | Chen et al. |
| 2010/0157078 A1 | 6/2010 | Atanassov et al. |
| 2010/0271498 A1 | 10/2010 | Hwang et al. |
| 2011/0228295 A1 | 9/2011 | Doida |
| 2011/0242334 A1 | 10/2011 | Wilburn et al. |

OTHER PUBLICATIONS

Mertens, et al., "Exposure Fusion", Retrieved at <<http://tonemap.googlecode.com/svn-history/r8/trunk/papers/exposure_fusion_reduced.pdf>>, In Proceedings of 15th Pacific Conference on Computer Graphics and Applications, Oct. 29, 2007, pp. 382-390.

Petsch Nigg, et al., "Digital photography with flash and no-flash image pairs", Retrieved at <<http://research.microsoft.com/en-us/um/redmond/projects/flashnoflash/>>, Proceedings of ACM Trans. on Graphics (SIGGRAPH), 23 (3), 2004, pp. 9.

Burt, et al., "Enhanced Image Capture Through Fusion", Retrieved at <<http://ieeexplore.ieee.org/xpls/abs_all.jsp?arnumber=378222&tag=1, Proc. of the ICCV, 1993, pp. 173-182.

Burt, et al., "The Laplacian Pyramid as a Compact Image Code", Retrieved at <<http://ieeexplore.ieee.org/xpls/abs_all.jsp?arnumber=1095851>>, IEEE Transactions on Communications, Apr. 1983, pp. 532-540.

US 9,332,210 B2

COMBINING MULTIPLE IMAGES IN BRACKETED PHOTOGRAPHY

CROSS-REFERENCE TO RELATED APPLICATIONS

This application is a divisional of U.S. application Ser. No. 13/523,921, filed Jun. 15, 2012, the entirety of which is hereby incorporated by reference herein.

BACKGROUND

Some existing computational photography techniques combine multiple images into a single image. Referred to as multiframe captures or bracketed photography, multiple consecutive shots of a scene may be combined to produce an image that is visually superior to any of the individual input images. For example, in high dynamic range (HDR) photography, images are taken using bracketed exposures or HDR sensors and represented on a low dynamic range (LDR) display after tone mapping.

Some of the existing computational photography techniques address specific types of input images, such as flash/no-flash image pairs or images at different exposures. None of the existing systems, however, provides a robust, unified mechanism for processing a variety of available input images.

SUMMARY

Embodiments of the disclosure combine a plurality of high dynamic range images, flash-no-flash image pairs, and/or other images captured during bracketed photography to produce a final image. Weight masks are defined for each of the plurality of images. Defining the weight masks includes, in some embodiments, calculating coefficients for each of the weight masks at least by performing histogram alignment between a reference image and each of the other images and by applying a mismatch bias to the coefficients as a function of the histogram alignment. The weight masks are applied to the corresponding images. The images are combined to produce a final image.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

Corresponding reference characters indicate corresponding parts throughout the drawings.

DETAILED DESCRIPTION

Referring to the figures, embodiments of the disclosure provide a unified method for combining multiple images 102 such as in high dynamic range photography, flash/no-flash image pairs, or forms of bracketed photography. In some embodiments, any quantity of images 102 with similar or different exposure values, with flash, or without flash, from bracketed captures are combined directly to produce displayable content, such as a final image 106. Weighting coefficients are determined for each pixel of each input image 102, and a multi-resolution blending is applied to merge the images 102 as a function of the determined weighting coefficients.

Aspects of the disclosure provide global motion compensation and local motion compensation with optimized cropping, white balance alignment, automatic red-eye reduction, local motion artifact reduction by avoiding mismatch, noise reduction by averaging, and long-exposure blur reduction by preferring high gradient (e.g., sharp) image areas. Aspects of the disclosure are further operable with any form of bracketing including, but not limited to, focus bracketing, depth-of-field bracketing, white balance bracketing, or ISO bracketing, and provide a speed advantage over existing systems. Additionally, some embodiments are operable with heterogeneous bracketing (e.g., combination of heterogeneous parameters) or multiple types of bracketing (e.g., independently or jointly) in the same blend. Some examples combine exposure bracketing with flash bracketing, such as long exposure with no flash, medium exposure with no flash, short exposure with no flash, medium exposure with flash, medium exposure with high aperture, and the like.

Figure 1:
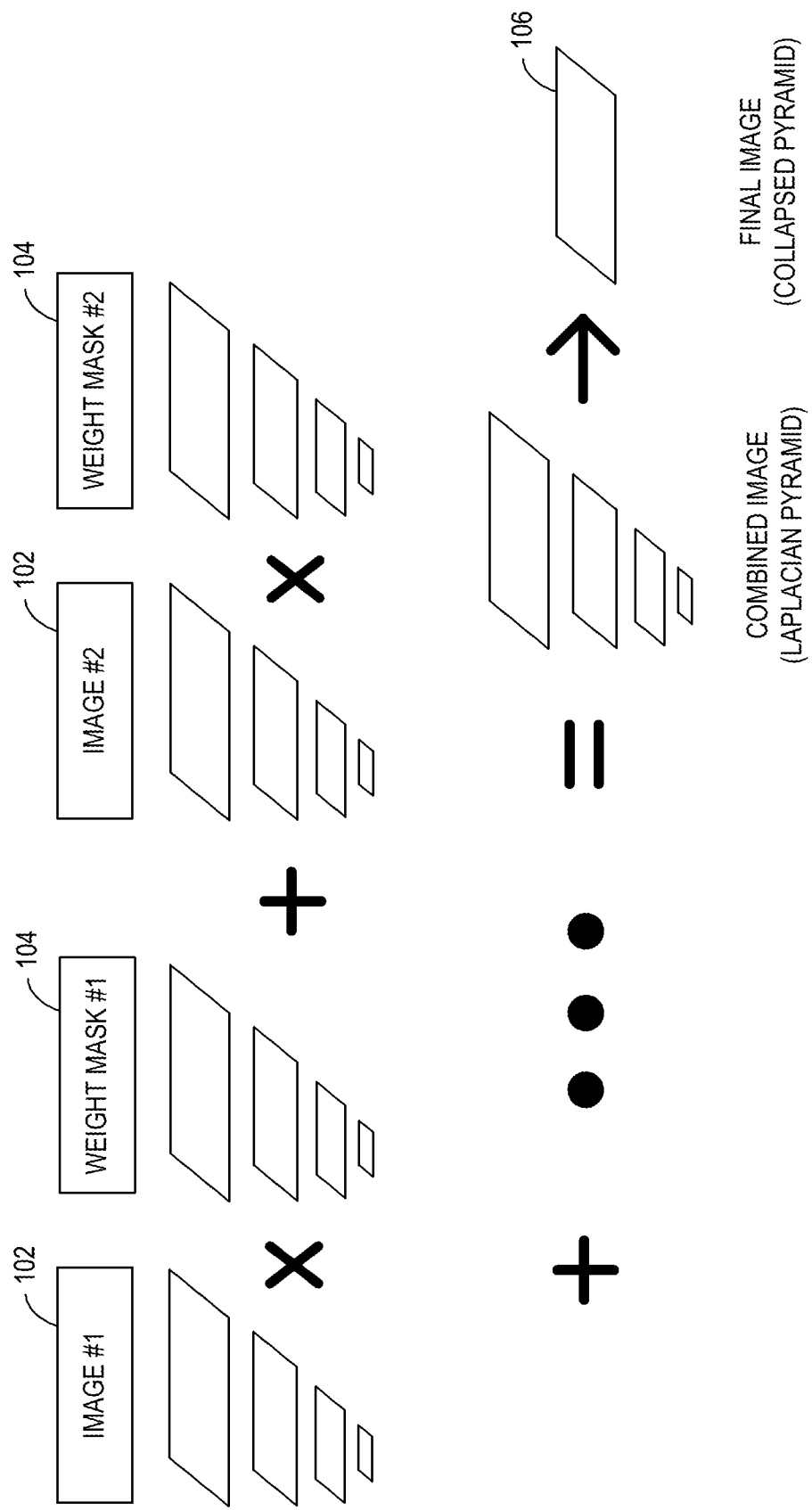
FIG. 1 is an exemplary block diagram illustrating the application of weight masks to input images to produce a final image.

Referring to FIG. 1, an exemplary block diagram illustrates the application of weight masks 104 to input images 102 to produce the final image 106. In the example of FIG. 1, a plurality of the input images 102 such as image #1 and image #2 are weighted with a corresponding plurality of weight masks 104 such as weight mask #1 and weight mask #2. In some embodiments, each of the weight masks 104 represents a set of weightings, or coefficients, to be applied to the pixels within at least one of the images 102. The weight masks 104 are applied to the pixels in a particular image 102 by multiplying the coefficients with the pixel values at each of the pixel locations within the image 102.

In some embodiments, the weighted images 102 are combined via a Laplacian pyramid to produce the final image 106. For example, combining the images 102 produces a Laplacian pyramid that is collapsed to produce the final image 106. In this manner, a weighting function is used with a Laplacian pyramid, as described below.

Figure 2:
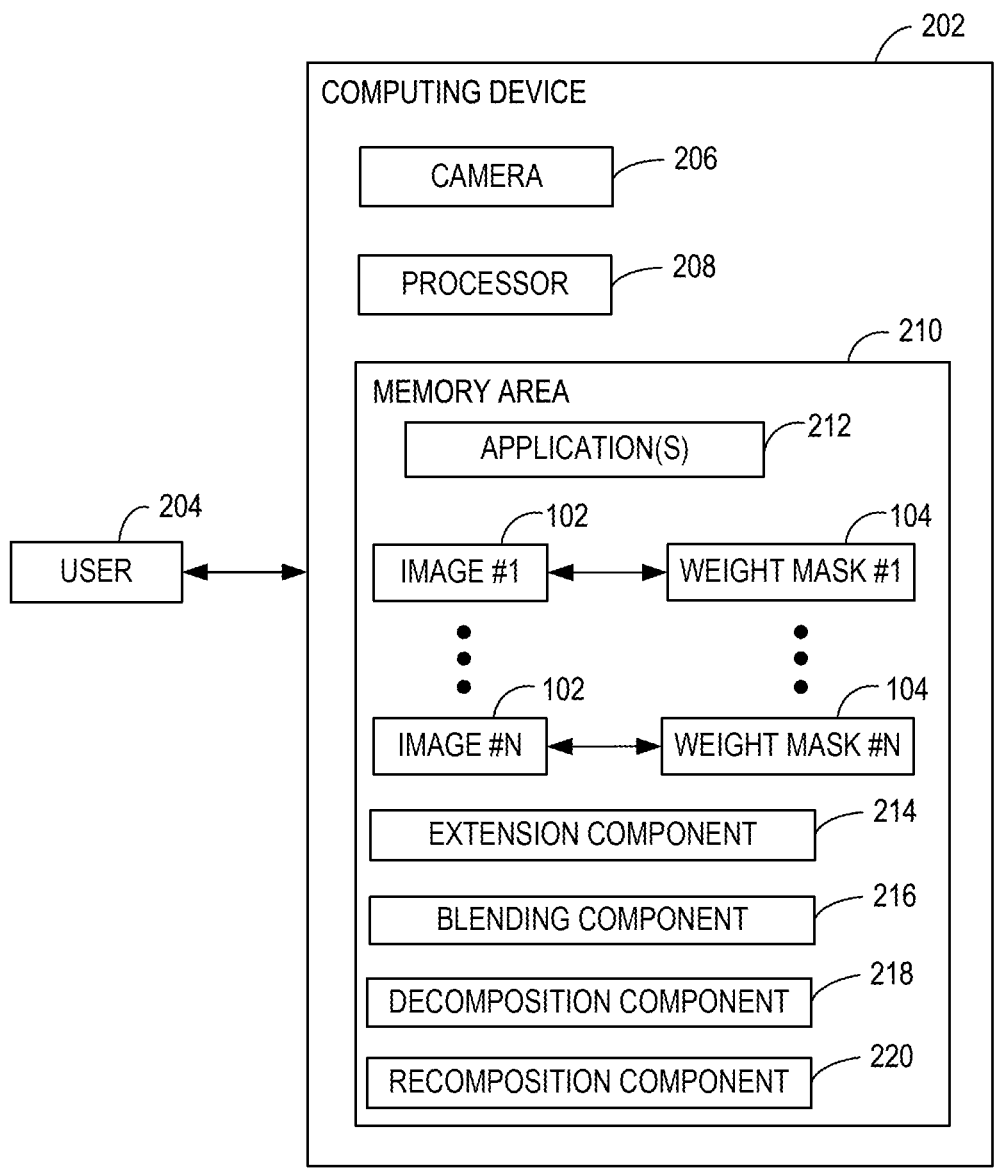
FIG. 2 is an exemplary block diagram illustrating a computing device having a camera for capturing and processing a plurality of images, such as in bracketed photography.

Referring next to FIG. 2, an exemplary block diagram illustrates a computing device 202 having a camera 206 for capturing and processing a plurality of images 102, such as in bracketed photography. In the example of FIG. 2, the computing device 202 is associated with at least one user 204. The computing device 202 represents any device executing instructions (e.g., as application programs, operating system functionality, or both) to implement the operations and functionality associated with the computing device 202. The computing device 202 may include a mobile computing device or any other portable device. In some embodiments, the mobile computing device includes a mobile telephone, laptop, tablet, computing pad, netbook, gaming device, and/or portable media player. The computing device 202 may also include less portable devices such as desktop personal computers, kiosks, and tabletop devices. Additionally, the computing device 202 may represent a group of processing units or other computing devices.

Further, while the computing device 202 in FIG. 2 is shown to include the camera 206 and perform functionality such as described in FIG. 3, FIG. 5, FIG. 6, and FIG. 7, other embodiments are contemplated. For example, aspects of the disclosure are operable with a digital camera that has a processor, or otherwise communicates with a device that has a processor, for implementing the functionality described in FIG. 3, FIG. 5, FIG. 6, and FIG. 7. In another example, aspects of the disclosure may be performed by a cloud computing system, without any camera, that receives images 102 from the computing device 202 or receives images 102 from any other device with the camera 206 or other capture device.

Further, while aspects of the disclosure are described with reference to images 102 captured by the computing device 202, aspects of the disclosure are operable with any images 102 from any source or combination of sources. For example, in some embodiments, the images 102 represent frames sampled from a video stream or other video source.

In some embodiments, the computing device 202 has at least one camera 206, at least one processor 208, and at least one memory area 210. The camera 206 includes any device or apparatus for capturing still images or video, with or without audio. The camera 206, or computing device 202, may have auxiliary lighting such as a flash for activation when capturing the images 102. The camera 206, or computing device 202, may be capable of various configurations or settings for capturing the images 102. For example, the camera 206 may be capable of capturing images 102 at multiple exposures, multiple apertures (e.g., F-stops), etc.

The processor 208 includes any quantity of processing units or types of processing entities, and is programmed to execute computer-executable instructions for implementing aspects of the disclosure. The instructions may be performed by the processor 208 or by multiple processors executing within the computing device 202, or performed by a processor external to the computing device 202. In some embodiments, the processor 208 is programmed to execute instructions such as those illustrated in the figures (e.g., FIG. 3, FIG. 5, FIG. 6, and FIG. 7).

In some embodiments, the processor 208 or other components of the computing device 202 represents an implementation of analog techniques to perform the operations described herein. For example, the operations may be performed by an analog computing device and/or a digital computing device.

The computing device 202 further has one or more computer readable media such as the memory area 210. The memory area 210 includes any quantity of media associated with or accessible by the computing device 202. The memory area 210 may be internal to the computing device 202 (as shown in FIG. 2), external to the computing device 202 (not shown), or both (not shown). In some embodiments, the memory area 210 includes read-only memory and/or memory wired into an analog computing device.

The memory area 210 stores, among other data, one or more applications 212. The applications 212, when executed by the processor 208, operate to perform functionality on the computing device 202. Exemplary applications 212 include mail application programs, web browsers, calendar application programs, address book application programs, messaging programs, media applications, location-based services, search programs, and the like. The applications 212 may communicate with counterpart applications or services such as web services accessible via a network. For example, the applications 212 may represent downloaded client-side applications that correspond to server-side services executing in a cloud.

The memory area 210 further stores a plurality of the images 102, such as image #1 through image #N, and a plurality of weight masks 104, such as weight mask #1 through weight mask #N. Each weight mask 104 corresponds to at least one of the images 102. Each of the weight masks 104 includes a set of coefficients each corresponding to a pixel location.

Exemplary images 102 include a flash image 602 (e.g., one of the images 102 taken while activating a flash or other light source), and a no-flash image (e.g., one of the images 102 taken without the flash). In some embodiments, a plurality of the images 102 of substantially the same scene may be grouped together or otherwise associated. Each of the images 102 in such a group may have been taken with different camera 206 configurations such as different exposures.

As described below, one of the images 102 may be selected as a reference image 604. Criteria for selecting the reference image 604 may differ based on the processing to be performed and/or the group of images 102 being processed. For example, when processing a pair or group of flash/no-flash images, the no-flash image is selected as the reference image 604. In another example, when processing a group of HDR images 102, the image 102 with medium exposure among the images 102 in the group is selected as the reference image 604. In still another example, the image 102 with the "best" exposure is selected as the reference image 604. In some embodiments, criteria for selecting the "best" exposure includes how close the average luma of the image 102 is from a target average of 0.3 (e.g., in a 0-1.0 luma range). The computing device 202 then selects the image 102 having an average luma closest to 0.3 as the reference image 604. In other embodiments, selecting the "best" exposure includes selecting the image 102 with the best or most distributed luma histogram as the reference image 604. For example, the best or most distributed luma histogram may be determined using maximum entropy criteria.

The memory area 210 further stores one or more computer-executable components. Exemplary components include an extension component 214, a blending component 216, a decomposition component 218, and a recomposition component 220. Operation of these components is described below with reference to FIG. 7.

Figure 3:
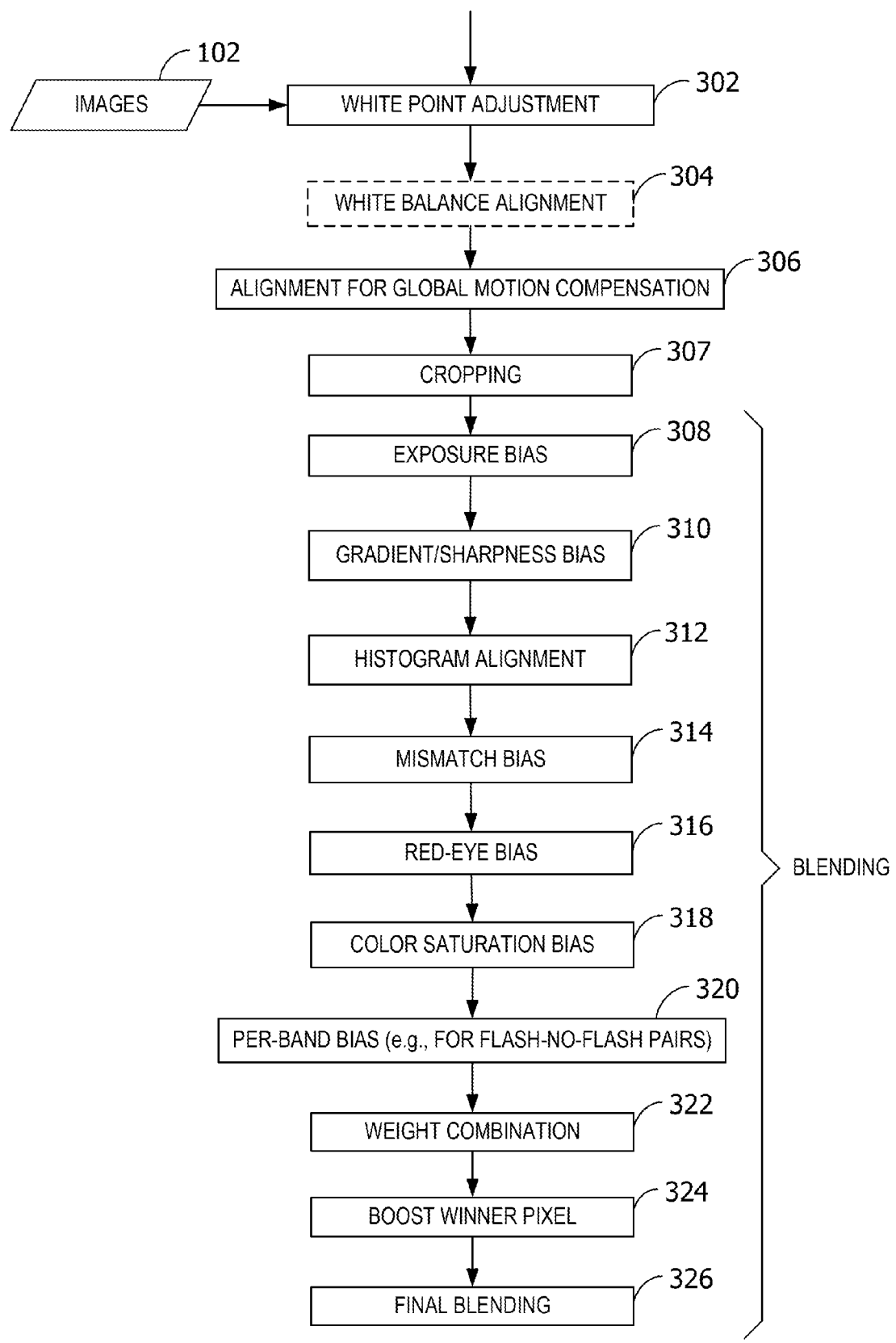
FIG. 3 is an exemplary flow chart illustrating operation of the computing device to condition and combine a plurality of images into a final single image.

Referring next to FIG. 3, an exemplary flow chart illustrates operation of the computing device 202 to condition and combine the plurality of images 102 into the final single image. At 302, the computing device 202 performs a white balance adjustment or correction (e.g., per-color-channel correction), histogram stretching (e.g., contrast stretching or a white point adjustment), color adjustment (e.g., per-color-channel correction), or other adjustment on the input images 102 to ensure that each of the images 102 has a full dynamic range. In some embodiments, the white point adjustment includes applying a linear transformation (e.g., a gain or other multiplying factor), but not an offset, to pixel values associated with each image 102 so that pixel intensities occupy as much of the available full dynamic range as possible.

The white point adjustment may be performed by, for example, recording the 256-level histogram of the luma (Y) or RGB channels on a full resolution or downscaled version of each input image 102. In some embodiments, the histogram is a graphical representation of pixel tone in one of the images 102. For example, shadows may be represented on the left side of the histogram while highlights may be represented on the right side of the histogram.

For each image 102, an average point and a high point of the histogram are calculated. In some embodiments, the average point represents the average of pixel intensities in the histogram and the high point represents the 0.02% highest intensity point in the histogram (e.g., only 0.02% of pixels are brighter than the high point value). While use of 0.02% as the intensity criteria enables the white point adjustment to be resistant to possible noise and limits the quantity of pixels that could reach saturation (e.g., overexposure), aspects of the disclosure are operable with intensity criteria other than 0.02%.

Gain is calculated for the luma (Y) to stretch the histogram such as shown in Equation (1) below.

$$Overall\_Gain=1/High\_Point \quad (1)$$

For the RGB channel (e.g., rather than the luma), the histogram is stretched such as shown in Equations (2), (3), (4), and (5) below.

$$GainRMax=1/\max(High\_Point\_Channel\_R) \quad (2)$$

$$GainGMax=1/\max(High\_Point\_Channel\_G) \quad (3)$$

$$GainBMax=1/\max(High\_Point\_Channel\_B) \quad (4)$$

$$Overall\_Gain=\min(GainRMax,GainGMax,GainBMax) \quad (5)$$

In some embodiments, robustness is increased by setting a lower limit to the high point to avoid drastic correction, such as shown in Equation (6) below with an exemplary lower limit.

$$Gain=\min(Gain,4) \quad (6)$$

Further, the gain may be clamped so that the average intensity after correction does not become larger than a predetermined maximum (unless the maximum was already reached before correction), such as shown in Equation (7) below. In some embodiments, the Maximum_Expected_Average is set to 155/255, or approximately 0.61, although aspects of the disclosure are operable with other Maximum_Expected_Average values.

$$Gain=\max(1,\min(Gain,Maximum\_Expected\_Average/Measured\_Average\_Point)) \quad (7)$$

At 304, an optional white balance alignment is performed. For example, if the computing device 202 suspects that the image 102 may not have the same white balance (e.g., when combining the flash image 602 with the no-flash image), the white balance alignment is performed. The white balance alignment is performed, in some embodiments, by selecting the image 102 with the "best" exposure (e.g., the best exposed input image 102, as described above) among the no-flash images as the reference image 604. Determining the input image 102 with the "best" exposure may be accomplished by comparing the average luma of each image 102 to a target average luma, such as approximately 0.3, and selecting the image 102 with the smallest distance or deviation from the target average luma. The exemplary target average luma of 0.3 is selected based on the tone response curves (e.g., gamma curves) used by the camera 206 in the image creation process.

The computing device 202 further calculates the average intensity for each of the R, G, and B channels while skipping pixels that are over-exposed (e.g., greater than 0.98) to avoid biasing the white balance. The computing device 202 applies a per-channel gain or other correction to each of the images 102 $i$ so that each image 102 matches the average color of the reference image 604, such as shown in Equations (8), (9), and (10). Rr, Gr, and Br represents the average color of the reference image 604 and Ri, Gi, and Bi represent the average for the image 102 $i$.

$$Gain1R=Rr/Ri \quad (8)$$

$$Gain1G=Gr/Gi \quad (9)$$

$$Gain1B=Br/Bi \quad (10)$$

In other embodiments, the gain values for the R, G, and B channels are calculated by performing a histogram matching between the R, G, and B histograms of the image 102 with the R, G, and B histograms, respectively, of the reference image 604. Histogram matching is described below with reference at least to FIG. 5. The histogram matching function is used to estimate the average ratio of pixel values between matching pixels of the reference image 604 and the images 102 in regions that are neither overexposed nor underexposed.

In still other embodiments, the gain values calculated using each of the above methods are compared with each other to select the gain value closest to a gain of 1 to select the most conservative correction.

The selected gain values Gain1R, Gain1G, and Gain1B for the R, G, and B channels, respectively, are scaled by a multiplicative factor $\alpha$ to perform a gentle white balance until none of the channels are clipped (e.g., having over-exposed pixels). The multiplicative factor $\alpha$ is chosen, for example, to avoid generating clipping in any of the channels (e.g., above a maximum range such as 255) and may be calculated as shown in Equation (11) below. In Equation (11), GainRMax, GainGMax, and GainBMax represent the maximum gains guaranteeing that no more than 0.02% of pixels will be clipped.

$$\alpha=\min(GainRMax/Gain1R,GainGMax/Gain1G,GainBMax/Gain1B) \quad (11)$$

The computing device 202 calculates the final per-channel gains as shown in Equations (12), (13), and (14) below by multiplying each gain by $\alpha$.

$$GainR=\alpha Gain1R \quad (12)$$

$$GainG=\alpha Gain1G \quad (13)$$

$$GainB=\alpha Gain1B \quad (14)$$

The final per-channel gain values may be clamped within a range, such as from 0.5 to 2.0, to avoid drastic color balance corrections. Further, the global or per-channel gains calculated above may be applied together.

At 306, the computing device 202 performs alignment for global motion compensation. For example, if the user 204 moves the camera 206 during image 102 capture, the computing device 202 compensates for the motion to avoid ghosting in the final image 106. Aspects of the disclosure are operable with any feature-based alignment algorithm as known in the art to calculate the transform to apply to the images 102. The transform may include translation, rotation, and/or scaling. The transformed images 102 are then aligned to the reference image 604 selected above.

After alignment for global motion compensation, some areas near the edges of the images 102 may not be represented in each of the images 102 or frames. The computing device 202 operates to find the largest rectangle included within the intersection of the images 102. In each image 102, the areas outside this largest rectangle are cropped at 307. For example, the computing device 202 grows a rectangle within the intersection of the images 102, adjusting the direction(s) of growth and moving the rectangle within the image intersection until the rectangle has reached a maximum size.

The input images 102 are blended with operations 308, 310, 312, 314, 316, 318, 320, 322, 324, and 326. In general, blending takes the high quality portions of each of the images 102 for combination into the final image 106 while avoiding, or downweighting, the low quality portions. The high quality portions and the low quality portions are identified via various metrics, as described herein.

In operation, the pixels in each of the images 102 are weighted by a factor or coefficient to be calculated during the blending. The set or group of coefficients for each image 102 is referred to as the weight mask 104, such as shown in FIG. 1. The larger coefficients weight the pixels more than the smaller coefficients. In some embodiments, the pixel blending is a multi-resolution blending that may be applied in different resolution sub-bands.

Figure 4:
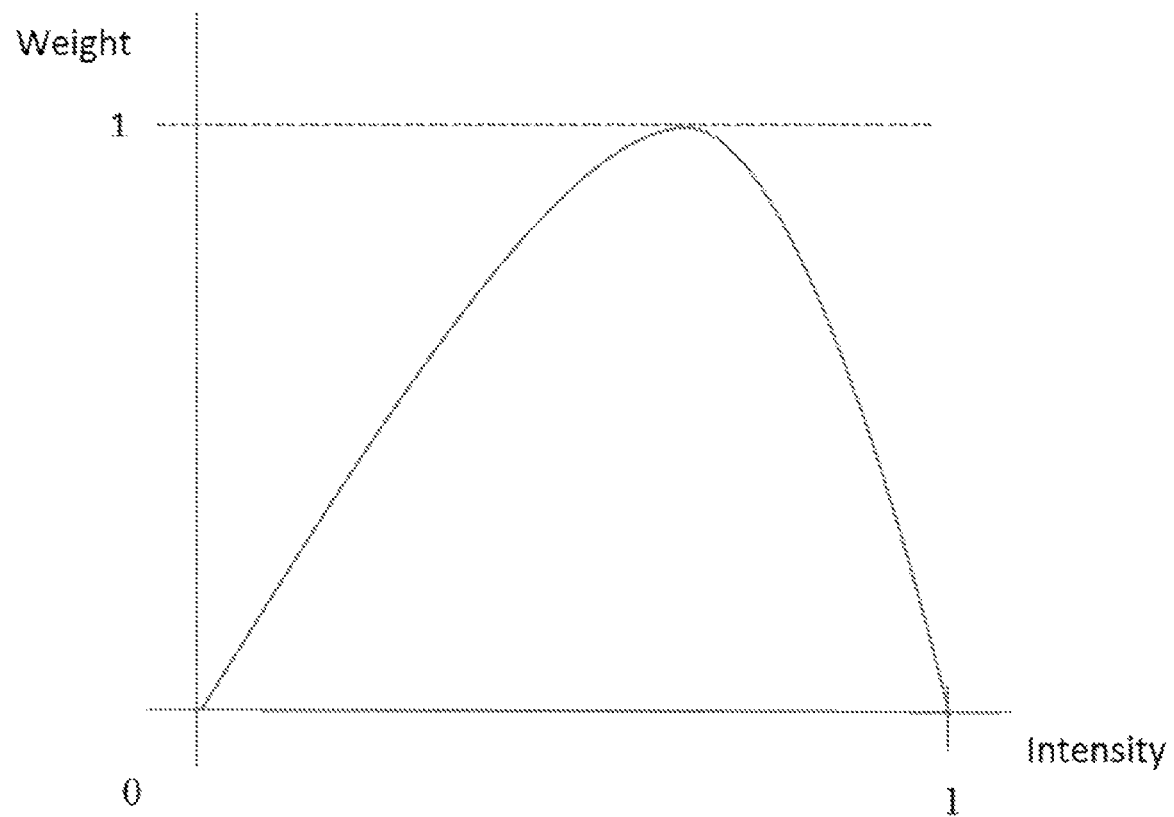
FIG. 4 is an exemplary graph illustrating an exposure bias function.

At 308, an exposure bias is calculated to weight in favor of well-exposed pixels. A weight function We, such as illustrated in FIG. 4, is defined by Equation (15) below.

$$We = 1 - |2i^\beta - 1|^\gamma \quad (15)$$

In Equation (15), the exposure weight We is in the 0-1 range and pixel intensity i is in the 0-1-range. In some embodiments, $\beta=1.6$ and $\gamma=2$ for high dynamic range images 102, while $\beta=1.5$ and $\gamma=3$ for flash/no-flash image pairs. Aspects of the disclosure are operable, however, with other value for these variables. Further, luma Y may be used as the pixel intensity i.

Further, the computing device 202 downweights pixels that are saturated or close to over-exposure (e.g., with values close to 255, such as anything greater than or equal to 251, in any of the R, G, and B channels), such as shown in Equation (16) below. Downweighting those pixels may occur by setting the coefficients for those pixels close to zero.

$$We(\text{final}) = \tau We \quad (16)$$

Aspects of the disclosure are operable with various values for $\tau$ in Equation (16). In some embodiments, $\tau \approx 0$ if Max(R, G,B)=255; $\tau$=0.5 if Max(R,G,B)=254; and $\tau$=1 otherwise.

At 310, the computing device 202 calculates a weight to apply a gradient/sharpness bias to favor (e.g., weight more heavily) high gradient areas and downweight blurry regions. An exemplary gradient/sharpness bias may be defined as shown in Equation (17) or Equation (18) below.

$$W_g = |\text{grad}_x| + |\text{grad}_y| \quad (17)$$

$$W_g = \sqrt{\text{grad}_x^2 + \text{grad}_y^2} \quad (18)$$

In Equation (17) and Equation (18), the x-axis and y-axis gradient values are calculated for a 3×3 pixel area or neighborhood. A 3×3 neighborhood is less sensitive to noise that may occur in short exposures. However, aspects of the disclosure are operable with other gradient or local contrast calculations for the x-axis and/or y-axis. For example, a Laplacian operator or local variance may be performed to quantify the local sharpness.

Histogram alignment is performed at 312 and a mismatch bias is calculated and applied at 314. These operations are described below with reference to FIG. 5.

A red-eye bias is calculated and applied at 316. This operation is described below with reference to FIG. 6. The red-eye bias may be represented as $W_{red}$.

At 318, the computing device 202 calculates a color saturation bias to favor saturated (e.g., more colorful) regions, such as shown in Equation (19) below.

$$W_s = \alpha \max \frac{(|U|, |V|)}{Y} + (1 - \alpha) \quad (19)$$

In Equation (19), Y is the luma component while U and V are the chroma components in the YUV color space. The factor $\alpha$ is a constant that is set to 0.375 for flash/no-flash image pair and 1.0 in high dynamic range images 102, in some embodiments. Aspects of the disclosure are operable, however, with other values for $\alpha$.

The color saturation may be represented in other ways in other embodiments. For example, in the HSL or HSV color spaces, the S component represents the color saturation.

If red-eye is strongly suspected (e.g., $W_{red}$<1), the weight $W_s$ is not used. Instead, for the YUV color space, weights may be calculated such as shown in Equation (20) below.

$$\begin{pmatrix} Y \\ U \\ V \end{pmatrix} = \begin{pmatrix} 0.299 & -0.587 & 0.886 \\ -0.337 & -0.663 & 1 \\ 1 & -0.837 & -0.163 \end{pmatrix} \begin{pmatrix} R \\ G \\ B \end{pmatrix} \quad (20)$$

Aspects of the disclosure are operable, however, with factors other than those shown in Equation (20).

For flash/no-flash image pairs, the computing device 202 calculates a per-band bias at 320 in the context of the multi-resolution subband decomposition (e.g., the Laplacian decomposition and blending). In this example, the coefficients are biased or weighted towards the flash images 602 in detail sub-bands (e.g., high resolution) and towards the no-flash images in coarse sub-bands (e.g., low resolution). An exemplary weighting strategy is illustrated in Table 1 below, although other weighting strategies are within the scope of the disclosure.

TABLE 1

Exemplary Weighting Strategy for Calculating Per-Band Bias.

| | Laplacian Band Level | | | | | | | | |
|---|---|---|---|---|---|---|---|---|---|
| | 0 | 1 | 2 | 3 | 4 | 5 | 6 | 7 | 8 and others... |
| Weighting for No-Flash Images | 2% | 7% | 20% | 36% | 50% | 60% | 66% | 70% | 70% |
| Weighting for Flash Images | 98% | 93% | 80% | 64% | 50% | 40% | 34% | 30% | 30% |

At 322, the computing device 202 calculates the weight combination at each of the pixel locations by multiplying the individual weights, or coefficients, calculated in operations 310, 312, 314, 316, 318, and 320.

At 324, the computing device 202 further boosts the winner pixel, or the pixel with the most weight or largest coefficient, at each pixel location. For example, for each pixel location, the pixel with the greatest, strongest, heaviest, etc. weight among the weights for the other pixels in that pixel location is selected as the winner pixel. The weight of the winner pixel in each pixel location is multiplied by a factor or weight $W_{winner}$. In some embodiments, the weight $W_{winner}$ equals 2. If the winner pixel was also selected for an extra boost during calculation of the mismatch bias (see FIG. 5 below), the weight $W_{winner}$ equals 4 instead.

At 326, the computing device 202 performs final blending to produce the final image 106. For example, the coefficients in the weight masks 104 for the images 102 are normalized such that the sum of weights over the images 102 for each pixel location equals 1.

A buffer is allocated to contain a Laplacian decomposition. For each of the images 102 i from 1 to N, image 102 i is decomposed into a Laplacian pyramid. The computing device 202 calculates a Gaussian pyramid for the weight mask 104 for image 102 i. While the Gaussian pyramid may be calculated for just one image 102 at this point, in some embodiments the Gaussian pyramid is calculated for each of the images 102 to update the coefficients on a per-resolution basis.

For each level l from 0 to M in the Laplacian pyramidal decomposition, the weights are optionally updated and re-normalized according to the per-level bias described above. The computing device 202 accumulates the value of (weight*pixel value) in the buffer that has the same Laplacian pyramid layout as the images 102. For example, the mask weights are coming from the Gaussian pyramid (e.g., as described above) which has a pyramidal layout similar to the Laplacian pyramid. The resulting Laplacian pyramid is recomposed into the final image 106.

While described with reference to a Laplacian decomposition, aspects of the disclosure are operable with other multiresolution decompositions such as decimated or undecimated wavelets, and edge-preserving multiresolution decompositions.

Some of the operations illustrated in FIG. 3 are next described with reference to FIG. 5, FIG. 6, and FIG. 7.

Figure 5:
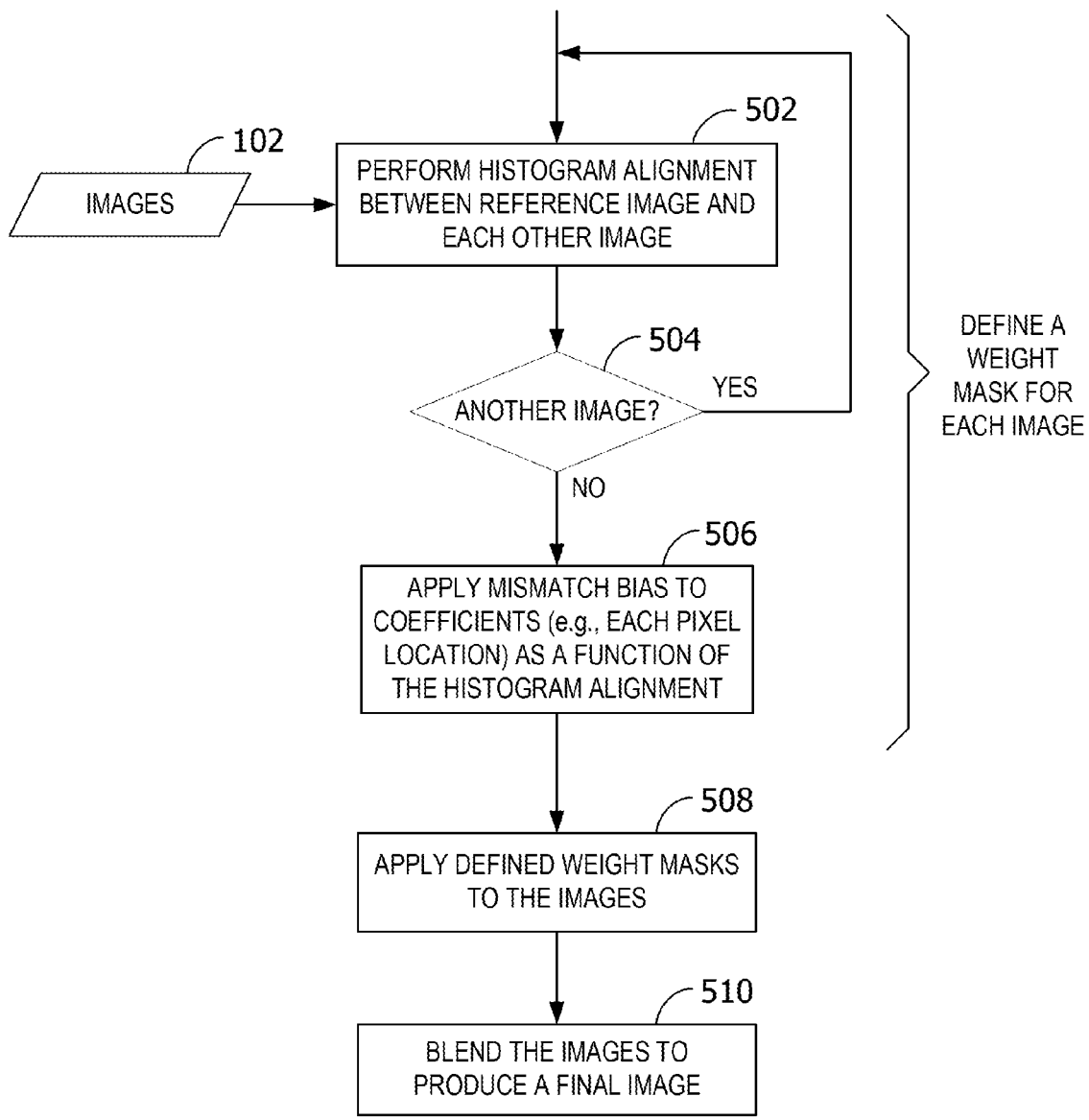
FIG. 5 is an exemplary flow chart illustrating operation of the computing device to define the weight masks by performing histogram alignment and applying mismatch bias.

Referring next to FIG. 5, an exemplary flow chart illustrates operation of the computing device 202 to define the weight masks 104 by performing, among other operations, histogram alignment and applying mismatch bias. In general, the computing device 202 may determine that the input images 102 are not well-matched based on the histogram alignment, and then calculate and apply the mismatch bias based on how much the images 102 differ (e.g., proportional to the mismatch). For example, the reference image 604 may be preferred or weighted more than the other images 102.

The computing device 202 accesses a plurality of the images 102, such as images 102 of substantially similar subject matter or time-consecutive shots of a particular scene. For example, the plurality of images 102 may have been captured with different settings of a capture device such as the computing device 202.

One of the images 102 is selected or designated as the reference image 604, such as described above. For example, the image 102 with the "best" exposure (e.g., as described above), or medium exposure, may be selected as the reference image 604 for a set of high dynamic range images 102. For a flash/no-flash image pair, the no-flash image may be selected as the reference image 604.

Operations 502, 504, and 506 execute to define the weight masks 104 each corresponding to one of the accessed images 102. Defining the weight mask 104 for each image 102 includes, among other operations, calculating a set of coefficients each corresponding to a pixel in the image 102. For each image 102, the coefficients are calculated by performing histogram alignment at 502 between the image 102 and the reference image 604. Histogram alignment enables comparison among images 102 of the same scene captured with different tone curves (e.g., different settings of the computing device 202 or other capture device). For example, by matching the luma (or per-channel) histograms of the images 102 with the reference image 604, the tone mapping (e.g., a look-up table) for converting one image 102 into another image 102 may be estimated.

Performing the histogram alignment includes, for example, calculating pixel histograms for each of the images 102, and calculating a histogram matching function based on the calculated pixel histograms of the reference image 604 and each of the other images 102. The histogram matching function is applied to compare pixel values between the reference image 604 and each of the other images 102. For example, for a pixel histogram Hr for the reference image 604 and pixel histogram Hi for each of the other images 102 i, the computing device 202 calculates the cumulative functions Sr and Si of the histograms. For each pixel value Pi in the 0-255 range, the computing device 202 finds the corresponding pixel value Pr such that Si(Pi)=Sr(Pr), also known as the histogram matching function. To compare pixel values from two similar images 102 acquired in different conditions, the computing device 202 applies the histogram matching function calculated between the two images 102. For example, for image i, the computing device 202 applies the histogram matching function from i to the reference image 604 before the computing device 202 compares pixels of image i with the reference image 604.

After histogram alignment has been performed for each of the images 102 other than the reference image 604, processing continues at 506. Otherwise, if there another image 102 at 504, histogram alignment is performed for that image 102. The histogram alignment is performed prior to calculation of the per-pixel mismatch bias, as next described. In some embodiments, the histogram alignment is discarded after the mismatch bias is calculated.

At 506, a mismatch bias is calculated and applied to the coefficients in each of the weight masks 104 as a function of the histogram alignment. That is, the mismatch bias is calculated as a function of the pixel difference between each image i and the reference image 604 after the histogram alignment of image i. The mismatch bias mitigates image regions with local misalignment (e.g., due to localized motion within the image 102). For example, objects that were moving within the image 102 at the time of capture may produce blurry regions. Also, parallax changes may cause ghosting artifacts in the final image 106. Applying the mismatch bias enables down-weighting of the blurry regions and noisy pixels because the reference image 604 is favored when a mismatch is detected locally.

In some embodiments, calculating or otherwise determining the mismatch bias includes calculating a variance of pixel values and weighting the reference image 604 based on the calculated variance. For each pixel location, the variance σ of the pixel values Pi is calculated in the images 102 i, after the histogram alignment has been performed. The larger the calculated variance, the more the reference image 604 is weighted, preferred, or favored.

For example, a weight $W_m$ is calculated, such as shown in Equation (21) below, for the images 102 (other than the reference image 604). In Equation (21), σ corresponds to the calculated variance and ρ is a constant.

$$W_m = \frac{1}{1 + \left(\frac{\sigma}{\rho}\right)^2} \quad (21)$$

While ρ is set to $$\frac{16}{256} = 0.0625$$

in some embodiments, aspects of the disclosure are operable with other values for ρ. The weight $W_m$ for the reference image 604 is set to 1. If σ>$t_1$ for a particular pixel, where $t_1$ is a threshold value, the pixel is flagged to be boosted, such as described above with reference to FIG. 3. While $t_1$ is set to $$\frac{32}{256} = 0.125$$

in some embodiments, aspects of the disclosure are operable with other values for $t_1$.

At 508, the defined weight masks 104 are applied to the corresponding images 102. For example, applying the weight masks 104 includes multiplying the calculated coefficients for each of the pixel locations together and to the pixel value at the pixel location. In some embodiments, the weight $W_m$, like any other individual weight, is first multiplied to the other weights. In such embodiments, the resulting weights are also normalized (as described below) before being applied (e.g., multiplied) to the pixel value.

At 510, the images 102 with the applied weight masks 104 are blended or otherwise combined to produce the final image 106. The blending may include producing and collapsing a Laplacian pyramid such as described with reference to FIG. 3 above.

Figure 6:
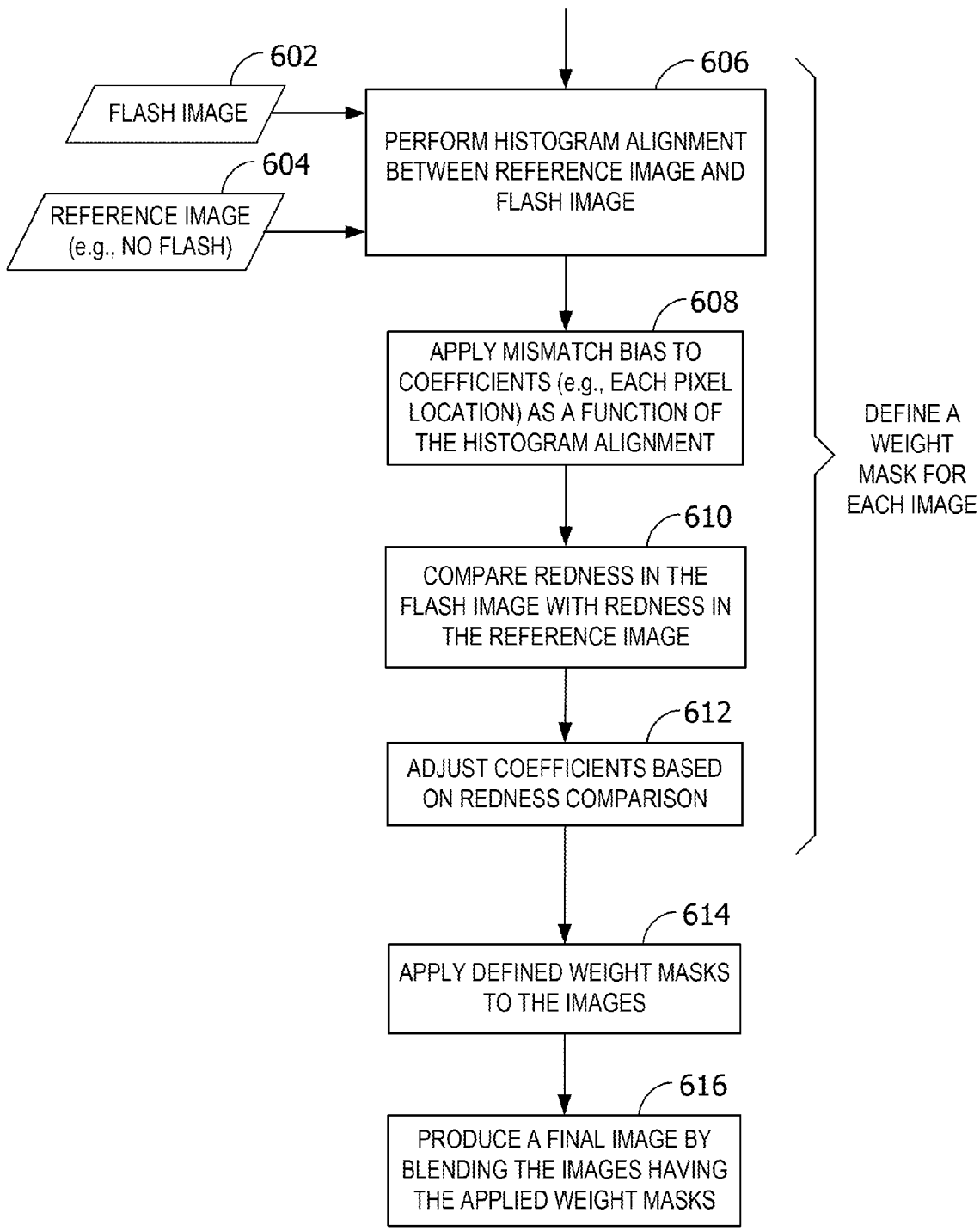
FIG. 6 is an exemplary flow chart illustrating operation of the computing device to detect and correct red-eye in flash-no-flash image pairs.

Referring next to FIG. 6, an exemplary flow chart illustrates operation of the computing device 202 to detect and correct red-eye in flash-no-flash image pairs. The computing device 202 accesses a plurality of the images 102, such as images 102 of substantially similar subject matter or time-consecutive shots of a particular scene. For example, the plurality of images 102 may have been captured with different settings of a capture device such as the computing device 202. In the example of FIG. 6, the plurality of images 102 includes flash/no-flash image pairs, or at least the flash image 602 and a no-flash image. The no-flash image is selected as the reference image 604. In embodiments with multiple no-flash shots, the computing device 202 selects the "best" exposed no-flash shot (e.g., as described above) as the no-flash shot to compare to the flash image 602.

Operations 606, 608, 610, and 612 execute to define the weight masks 104 each corresponding to one of the accessed images 102. Defining the weight mask 104 for each image 102 includes, among other operations, calculating a set of coefficients each corresponding to a pixel in the image 102. In embodiments in which the accessed images 102 include only the flash image 602 and the reference image 604, the coefficients are calculated by performing histogram alignment at 606 between the flash image 602 and the reference image 604. Exemplary histogram alignment is described above with reference to FIG. 5.

At 608, mismatch bias is calculated and applied to the coefficients as a function of the histogram alignment. Exemplary mismatch bias is described above with reference to FIG. 5.

The simultaneous presence of the flash image 602 and the no-flash image enable or prompt the computing device 202 to perform an automatic red-eye reduction scheme. At 610, redness in the flash image 602 is compared to redness in the reference image 604 (e.g., the no-flash image). The computing device 202 gauges, measures, suspects, or otherwise determines whether red-eye correction is warranted based on various metrics and/or factors. The computing device 202 suspects red-eye if the flash image 602 is reddish, the flash image 602 is brighter than the no-flash image, the no-flash image is not reddish, the no-flash image is not saturated or very dark, the no-flash image is dark, and/or the redness in the flash image 602 is greater than the redness in the no-flash image. Aspects of the disclosure are operable with any subset of the above factors for determining whether red-eye correction is warranted based on a comparison of the flash image 602 and the no-flash image.

For example, the computing device 202 determines if the flash image 602 is reddish by determining if $R_{FLASH}>G_{FLASH}$ and $R_{FLASH}>B_{FLASH}$ and $R_{FLASH}>$Threshold$_1$, wherein Threshold$_1$ is set to 0.25 in some embodiments (e.g., red-eye is clearly visible). The computing device 202 determines if the flash image 602 is brighter than the no-flash image by determining if $Y_{FLASH}>Y_{NOFLASH}$ (e.g., performed after histogram matching), wherein Y represents the luma as calculated in Equation (22) below. Aspects of the disclosure are also operable with other constants or factors applied in Equation (22).

$$Y = \text{Luma}(R,G,B) = 0.299*R + 0.587*G + 0.114*B \quad (22)$$

The computing device 202 determines if the no-flash image is not reddish by determining if $R_{NOFLASH}<=G_{FLASH}$ or $R_{FLASH}<=B_{FLASH}$. The computing device 202 determines if the no-flash image is not saturated (e.g., colorless) or very dark by determining if (Max(R,G,B)−Min(R,G,B))/Max(R,G,B)<0.5 or $Y_{NOFLASH}<=$Threshold$_2$, where Threshold$_2$ is set to 0.0625 in some embodiments (though other values for Threshold$_2$ are contemplated). The computing device 202 determines if the no-flash image is dark by determining if $Y_{NOFLASH}<$Threshold$_3$, where Threshold$_3$ is set to 0.25 in some embodiments (though other values for Threshold$_3$ are contemplated). The computing device 202 determines if the redness in the flash image 602 is greater than the redness in the no-flash image by determining or comparing $R_{FLASH}>R_{NOFLASH}$.

In some embodiments, the flash/no-flash-based red-eye detection as described herein is paired with traditional, single-image-based red-eye detection, such as using face feature detection from a single image, to make the detection even more trustworthy.

If one or more of the above conditions are met, the computing device 202 calculates ratios between redness in the flash image 602 and redness in the reference image 604. The ratios are calculated with a green-based redness and/or with a blue-based redness. Exemplary ratios are shown and compared in Equation (23) below. In Equation (23), $R_{NoFlash}$, $G_{NoFlash}$, and $B_{NoFlash}$ represent values for red, green, and blue, respectively, in the reference image 604 and $R_{Flash}$, $G_{Flash}$, and $B_{Flash}$ represent values for red, green, and blue, respectively, in the flash image 602. In Equation (23), the maximum of the ratios is selected.

$$A = \max\left(\frac{R_{NoFlash}/G_{NoFlash}}{R_{Flash}/G_{Flash}}, \frac{R_{NoFlash}/B_{NoFlash}}{R_{Flash}/B_{Flash}}\right) \quad (23)$$

The value of A in Equation (23) is close to zero when there is a surge in redness in the flash image 602 compared to the no-flash image.

At 612, the coefficients are calculated or otherwise adjusted based on the comparison between the redness in the flash image 602 and in the reference image 604. For example, adjusting the coefficients includes calculating a weight $W_{red}$ for the flash image 602 as shown in Equation (24) below. The weight for the no-flash image is set to 1.

$$W_{red} = \min(1, A)^4 \quad (24)$$

At 614, the defined weight mask 104 for the flash image 602 is applied to the flash image 602, and the defined weight mask 104 for the reference image 604 is applied to the no-flash image. For example, applying the weight masks 104 includes multiplying the calculated coefficients for each of the pixel locations together and to the pixel value at the pixel location.

At 616, the images 102 with the applied weight masks 104 are blended or otherwise combined to produce the final image 106. The blending may include producing and collapsing a Laplacian pyramid such as described with reference to FIG. 3 above.

Figure 7:
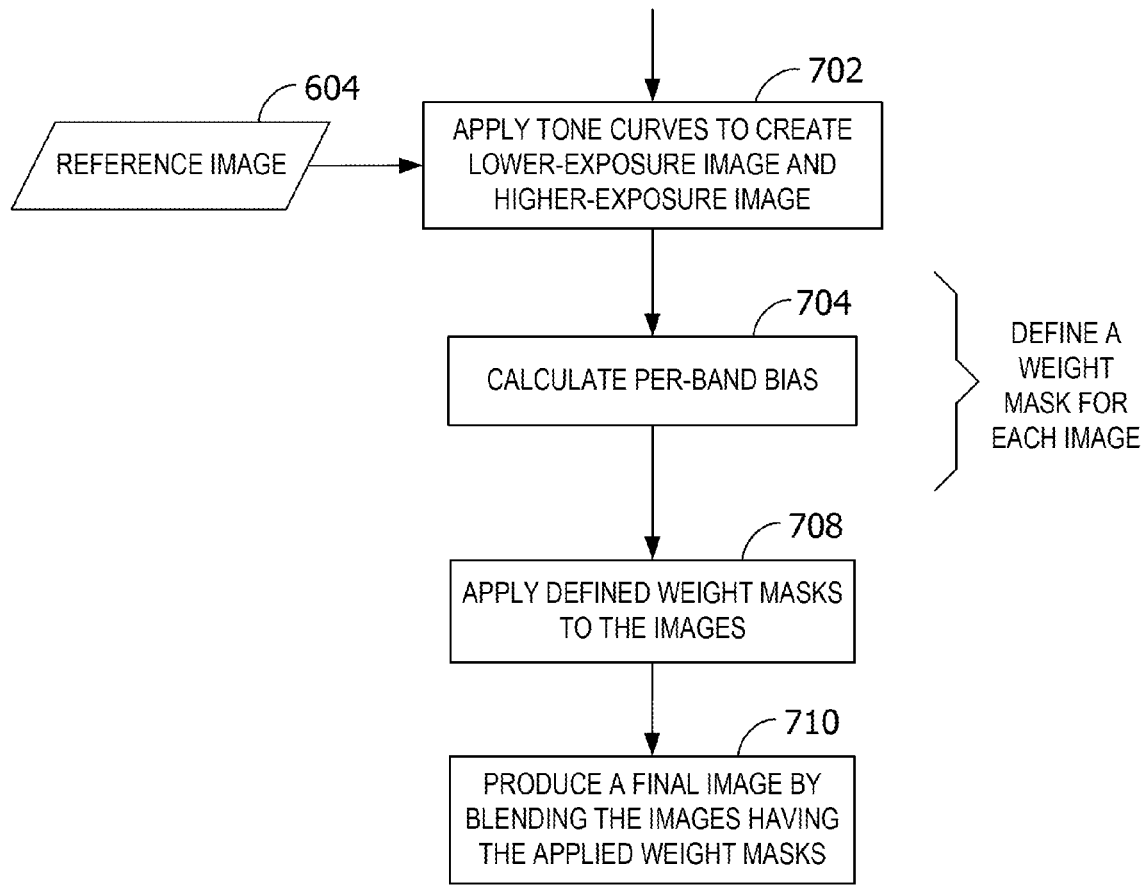
FIG. 7 is an exemplary flow chart illustrating operation of the computing device to apply tone curves to a reference image to create additional images for processing.

Referring next to FIG. 7, an exemplary flow chart illustrates operation of the computing device 202 to apply tone curves to the reference image 604 to create additional images 102 for processing. In general, a tone curve defines an output result given an input condition. Different tone curves may be applied to different regions of the images 102.

The operations illustrated in FIG. 7 execute to improve the quality of single images 102, such as the reference image 604. The operations may be implemented by the computer-executable components illustrated in FIG. 2. For example, the extension component 214, when executed by the processor 208, causes the processor 208 to apply at least one tone curve to the reference image 604 to create another image 102. For example, a lower-exposure image and a higher-exposure image are created at 702 from the reference image 604 through application of the tone curves, or other curve adjustment. The extension component 214 may access a stored reference image 604, or receive the reference image 604 acquired by the computing device 202 or received from other capture device.

The reference image 604, lower-exposure image, and higher-exposure image are then processed such as by the operations illustrated and described with reference to FIG. 3 above. In some embodiments, the operations in FIG. 3 execute to produce the final image 106 composed of shadows from the artificially brightened images, highlights from the artificially darkened image, and midtones from the reference image 604.

The blending component 216, when executed by the processor 208, causes the processor 208 to define weight masks 104 for each of the reference image 604, the lower-exposure image, and the higher-exposure image. The blending component 216 may further execute to perform one or more of the operations illustrated in FIG. 3.

The decomposition component 218, when executed by the processor 208, causes the processor 208 to apply each of the weight masks 104 defined by the blending component 216 to the corresponding reference image 604, lower-exposure image, or higher-exposure image at 708. As described herein, applying the weight masks 104 includes, for example, multiplying the calculated coefficients for each of the pixel locations together and to the pixel value at the pixel location.

The recomposition component 220, when executed by the processor 208, causes the processor 208 to produce the final image 106 at 710 by blending the reference image 604, the lower-exposure image, and the higher-exposure image output from the decomposition component 218. Blending the images 102 includes, for example, producing and collapsing a Laplacian pyramid such as described with reference to FIG. 3 above. For example, the computing device 202 accumulates the value of (weight*pixel value) in a buffer that has the same Laplacian pyramid layout as the images 102, and the resulting Laplacian pyramid is recomposed into the final image 106.

Additional Examples

At least a portion of the functionality of the various elements in FIG. 2 may be performed by other elements in FIG. 2, or an entity (e.g., processor, web service, server, application program, computing device, etc.) not shown in FIG. 2.

In some embodiments, the operations illustrated in FIG. 3, FIG. 5, FIG. 6, and FIG. 7 may be implemented as software instructions encoded on a computer readable medium, in hardware programmed or designed to perform the operations, or both. For example, aspects of the disclosure may be implemented as a system on a chip or other circuitry including a plurality of interconnected, electrically conductive elements.

While no personally identifiable information is tracked by aspects of the disclosure, embodiments have been described with reference to data monitored and/or collected from users 204. In such embodiments, notice is provided to the users 204 of the collection of the data (e.g., via a dialog box or preference setting) and users 204 are given the opportunity to give or deny consent for the monitoring and/or collection. The consent may take the form of opt-in consent or opt-out consent.

Exemplary Operating Environment

Exemplary computer readable media include flash memory drives, digital versatile discs (DVDs), compact discs (CDs), floppy disks, and tape cassettes. By way of example and not limitation, computer readable media comprise computer storage media and communication media. Computer storage media include volatile and nonvolatile, removable and non-removable media implemented in any method or technology for storage of information such as computer readable instructions, data structures, program modules or other data. Computer storage media are tangible, exclude propagated data signals, and are mutually exclusive to communication media. In some embodiments, computer storage media are implemented in hardware. Exemplary computer storage media include hard disks, flash drives, and other solid-state memory. In contrast, communication media typically embody computer readable instructions, data structures, program modules, or other data in a modulated data signal such as a carrier wave or other transport mechanism and include any information delivery media.

Although described in connection with an exemplary computing system environment, embodiments of the disclosure are capable of implementation with numerous other general purpose or special purpose computing system environments, configurations, or devices.

Examples of well-known computing systems, environments, and/or configurations that may be suitable for use with aspects of the disclosure include, but are not limited to, mobile computing devices, personal computers, server computers, hand-held or laptop devices, multiprocessor systems, gaming consoles, microprocessor-based systems, set top boxes, programmable consumer electronics, mobile telephones, network PCs, minicomputers, mainframe computers, distributed computing environments that include any of the above systems or devices, and the like.

Embodiments of the invention may be described in the general context of computer-executable instructions, such as program modules, executed by one or more computers or other devices. The computer-executable instructions may be organized into one or more computer-executable components or modules. Generally, program modules include, but are not limited to, routines, programs, objects, components, and data structures that perform particular tasks or implement particular abstract data types. Aspects of the invention may be implemented with any number and organization of such components or modules. For example, aspects of the invention are not limited to the specific computer-executable instructions or the specific components or modules illustrated in the figures and described herein. Other embodiments of the invention may include different computer-executable instructions or components having more or less functionality than illustrated and described herein.

Aspects of the invention transform a general-purpose computer into a special-purpose computing device when configured to execute the instructions described herein.

The embodiments illustrated and described herein as well as embodiments not specifically described herein but within the scope of aspects of the invention constitute exemplary means for automatically performing the histogram alignment, applying the mismatch bias, and performing red-eye correction on the images 102 captured by the computing device 202 during bracketed photography, and exemplary means for producing the final image 106 by automatically calculating the coefficients corresponding to pixel values for the images 102 captured by the computing device 202 during bracketed photography.

The order of execution or performance of the operations in embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

When introducing elements of aspects of the invention or the embodiments thereof, the articles "a," "an," "the," and "said" are intended to mean that there are one or more of the elements. The terms "comprising," "including," and "having" are intended to be inclusive and mean that there may be additional elements other than the listed elements.

Having described aspects of the invention in detail, it will be apparent that modifications and variations are possible without departing from the scope of aspects of the invention as defined in the appended claims. As various changes could be made in the above constructions, products, and methods without departing from the scope of aspects of the invention, it is intended that all matter contained in the above description and shown in the accompanying drawings shall be interpreted as illustrative and not in a limiting sense.

What is claimed is:

1. A system for combining images produced by bracketed photography, said system comprising:
    a camera associated with a mobile computing device, the camera having a flash for activation therewith;
    a memory area associated with the mobile computing device, said memory area storing a flash image captured by the camera while activating the flash and a reference image captured by the camera without activating the flash; and
    a processor programmed to:
        define weight masks for the flash image and the reference image stored in the memory area, defining the weight masks including calculating coefficients for each of the weight masks by:
            performing histogram alignment between the reference image and the flash image,
            applying mismatch bias to the coefficients as a function of the performed histogram alignment,
            comparing redness in the flash image to redness in the reference image, and
            adjusting the coefficients based on the comparison;
        apply the defined weight masks to the flash image and the reference image; and
        produce a final image by blending the reference image and the flash image with the corresponding weight masks.

2. The system of claim 1, wherein comparing redness in the flash image to redness in the reference image comprises calculating ratios between the redness in the flash image and the redness in the reference image.

3. The system of claim 2, wherein calculating the ratios comprises selecting either a ratio calculated with a green-based redness or a ratio calculated with a blue-based redness.

4. The system of claim 2, wherein calculating the ratios comprises calculating:

$$A = \max\left(\frac{R_{NoFlash}/G_{NoFlash}}{R_{Flash}/G_{Flash}}, \frac{R_{NoFlash}/B_{NoFlash}}{R_{Flash}/B_{Flash}}\right)$$

wherein $R_{NoFlash}$, $G_{NoFlash}$, and $B_{NoFlash}$ represent red, green, and blue, respectively, in the reference image and $R_{Flash}$, $G_{Flash}$, and $B_{Flash}$ represent red, green, and blue, respectively, in the flash image.

5. The system of claim 4, wherein adjusting the coefficients comprises calculating a weight $W_{red} = \min(1, A)^4$ for the flash image.

6. The system of claim 1, further comprising means for automatically performing the histogram alignment, applying the mismatch bias, and performing red-eye correction on images captured by the computing device during bracketed photography.

7. The system of claim 1, further comprising means for producing the final image by automatically calculating the coefficients corresponding to pixel values for images captured by the computing device during bracketed photography.

8. A method performed at least in part by a processor associated with a computing device to combine images produced by bracketed photography, said method comprising:
    defining a plurality of weight masks for a flash image captured by a camera while activating a flash and a reference image stored in a memory area, defining the plurality of weight masks including calculating one or more coefficients for one or more weight masks of the plurality of weight masks by:
        performing histogram alignment between the reference image and the flash image,
        applying mismatch bias to the one or more coefficients as a function of the performed histogram alignment,
        comparing redness in the flash image to redness in the reference image, and
        adjusting the one or more coefficients based on the comparison;

applying the plurality of defined weight masks to the flash image and the reference image; and producing a final image by blending the reference image and the flash image with corresponding weight masks of the plurality of weight masks.

9. The method of claim 8, wherein comparing redness in the flash image to redness in the reference image comprises calculating ratios between the redness in the flash image and the redness in the reference image.

10. The method of claim 9, wherein calculating the ratios comprises selecting either a ratio calculated with a green-based redness or a ratio calculated with a blue-based redness.

11. The method of claim 9, wherein calculating the ratios comprises calculating:

$$A = \max\left(\frac{R_{NoFlash}/G_{NoFlash}}{R_{Flash}/G_{Flash}}, \frac{R_{NoFlash}/B_{NoFlash}}{R_{Flash}/B_{Flash}}\right)$$

wherein $R_{NoFlash}$, $G_{NoFlash}$, and $B_{NoFlash}$ represent red, green, and blue, respectively, in the reference image and $R_{Flash}$, $G_{Flash}$, and $B_{Flash}$ represent red, green, and blue, respectively, in the flash image.

12. The method of claim 11, wherein adjusting the one or more coefficients comprises calculating a weight $W_{red}=\min(1, A)^4$ for the flash image.

13. The method of claim 8, wherein the reference image is an image captured by the camera without activating the flash.

14. The method of claim 8, wherein the flash image and the reference image are from a group comprising High Dynamic Range (HRD) images and wherein an image with a medium exposure among the group is selected as the reference image.

15. The method of claim 14, wherein white balance adjustments is performed on the HRD images to ensure full dynamic range for the HRD images.

16. The method of claim 8, wherein a best exposure image among a group of no-flash images is selected as the reference image.

* * * * *